United States Patent [19]

Keller

[11] 4,060,135
[45] Nov. 29, 1977

[54] SHEET METAL GARDEN TOOL

[75] Inventor: William A. Keller, Crestwood, Mo.

[73] Assignee: Keller Manufacturing Co., Inc., St. Louis, Mo.

[21] Appl. No.: 711,094

[22] Filed: Aug. 2, 1976

[51] Int. Cl.² .............................................. A01B 1/14
[52] U.S. Cl. .................................................. 172/380
[58] Field of Search ............... 172/380, 375, 378, 379;
56/400.01, 400.04, 400.16, 400.17, 400.21;
76/111; 294/55.5; D8/6, 13

[56] References Cited

U.S. PATENT DOCUMENTS

| 17,848 | 7/1857 | Shetter | 172/380 X |
|---|---|---|---|
| D. 47,021 | 3/1915 | Bruce | D8/13 |
| 295,103 | 3/1884 | Booker | 56/400.01 |
| 531,722 | 1/1895 | Hart | 56/400.16 |
| 1,249,213 | 12/1917 | Senn | 172/380 |
| 1,477,302 | 12/1923 | Swartz | 56/400.01 |
| 1,666,374 | 4/1928 | Gatti | 172/380 X |
| 1,706,658 | 3/1929 | Davis | 172/380 |
| 1,987,027 | 1/1935 | Rordell | 172/380 |
| 2,065,830 | 12/1936 | Sherman | 56/400.07 |
| 2,080,763 | 5/1937 | Cox | 172/380 X |

FOREIGN PATENT DOCUMENTS

| 122,920 | 11/1946 | Australia | 172/380 |
|---|---|---|---|
| 670,870 | 9/1963 | Canada | 172/380 |

*Primary Examiner*—Richard T. Stouffer
*Attorney, Agent, or Firm*—Glenn K. Robbins

[57] ABSTRACT

A sheet metal tool such as a garden rake or garden cultivator of special one piece metal construction. The garden tool such as a rake or the like is comprised of a flat body of steel which is pressed in a manufacturing operation to provide a body portion having reinforced rib strengthening structure including a continuous flange along each side thereof and a head portion bent over at right angles to the body portion and having particularly strong tines made possible by a generally U-shaped cross section at the rear but with the side walls being pressed solidly together at the tines ends to provide strength and rigidity and avoid accumulation of debris and thereby minimize rust contamination.

8 Claims, 11 Drawing Figures

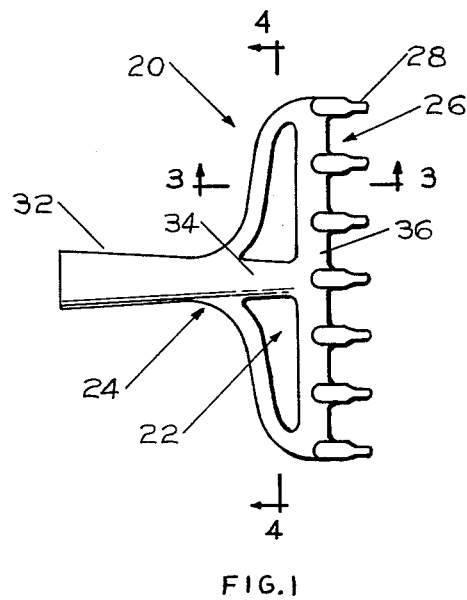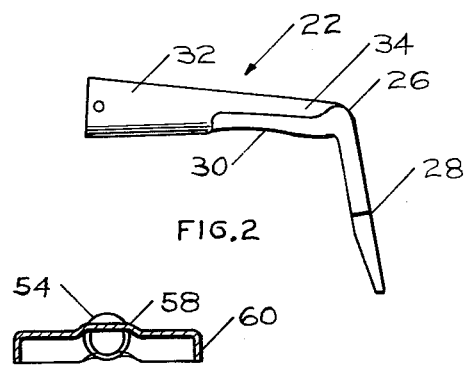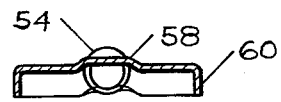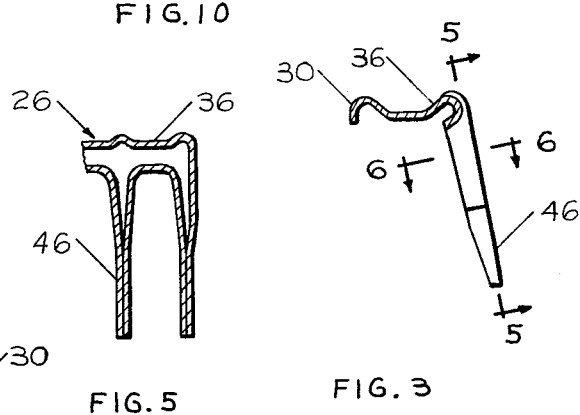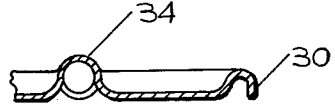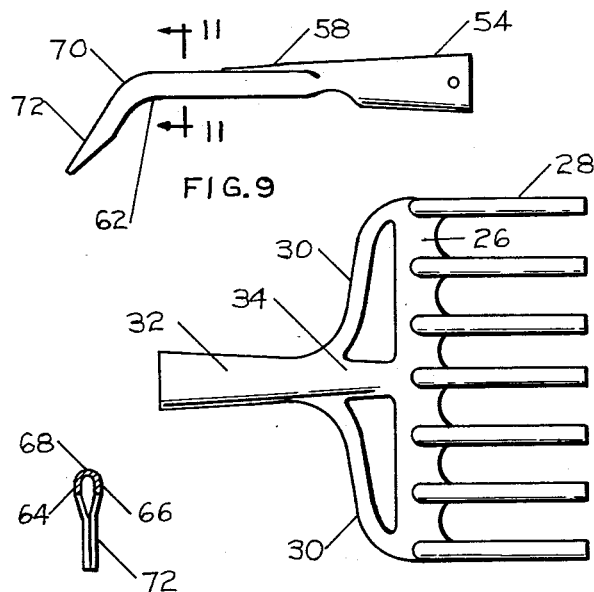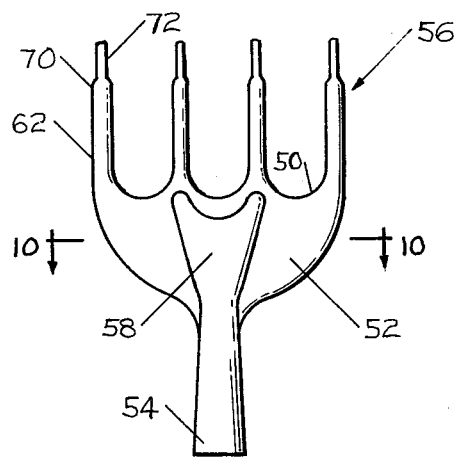

SHEET METAL GARDEN TOOL

SUMMARY OF THE INVENTION

In the past garden tools such as rakes and cultivators and the like had been generally constructed of forged or cast steel where strength is desired with rigidity. Such rakes are relatively expensive and require considerable capital expenditure in their manufacture. Where sheet metal rakes have been made they have generally been of the type not designed for relatively heavy use. Such sheet metal rakes have been used with tubular tines where substantial strength is not a problem. The collection of dirt, leaf particles and other vegetable matter in the tines of such rakes hass been a problem in the life of the tool due to rust which is accelerated by the collection of the foreign particles and dampness over a period of time.

By means of the instant invention there has been provided a sheet metal rake of substantial strength and rigidity which can be conveniently manufactured by a pressing and shearing operation. The rake is constructed of strong gauge sheet metal to rovide a flat body with a ferrule receiving a handle at a rear end and a forward head portion which is bent over to provide the tine portion used in the conventional rake of cultivator. Reinforcing ribs are provided in the body for strength and to prevent bending in heavy use.

The tine portions are of special construction being generally comprised of a U-shaped cross section and extending at right angles to the head portion and terminating with the free end of the tines in solidly pressed together solid walls which provide strength and rigidity. The pressed together portions extend for a substantial length of the tine, such as in the order of about half the length or so. This construction not only provides strength and rigidity but also due to the limited open U-shaped cross section connecting the head portion minimizes the collection of debris and vegetable matter causing rust.

The above features are objects of this invention and further objects will appear in the detailed description which follows and will be othewise apparent to those skilled in the art.

For the purpose of illustration of this invention there is shown in the accompanying drawings a preferred embodiment of the invention in the form of a rake and a garden cultivator. It is to be understood that these drawings are for the purpose of illustration and example only and that the invention is not limited thereto.

IN THE DRAWINGS:

FIG. 1, is a top plan view of the rake of this invention.
FIG. 2, is a view in side elevation.
FIG. 3, is a view in cross section taken on the line 3—3 of FIG. 1.
FIG. 4, is a fragmentary view in cross section taken on the line 4—4 of FIG. 1.
FIG. 5, is a view in section taken on the line 5—5 of FIG. 3.
FIG. 6, is a view in section taken on the line 6—6 of FIG. 3.
FIG. 7, is a plan view of the rake after the first pressing operation performed on a flat rake blank.
FIG. 8, is a top plan view of the invention embodied in a cultivator.
FIG. 9, is a view in side elevation of the cultivator.
FIG. 10, is a view in section taken on the line 10—10 of FIG. 8; and
FIG. 11, is a view in section taken on the line 11—11 of FIG. 9.

DESCRIPTION OF THE INVENTION

The rake of this invention is generally designated by the reference numeral 20 in FIG. 1 it is comprised of a body portion 22 having a rearward handle receiving portion 24, a forward head portion 26 and a plurality of tines 28.

The body 22 as best shown in FIGS. 2, 3 and 4 extends transversly and is bounded at the sides by perpendicular flanges 30 which have a C-shaped cross section to provide a grooved rib for reinforcement and strength and rigidity.

The body is further provided with a frustoconical rearwardly extending ferrule or handle receiving portion 24. This handle receiving portion is comprised of the frustoconical tubular member 32 which extends into the body as shown in FIGS. 1 and 4 to provide the C-shaped rib in cross section designated by the references numeral 34.

The head portion 26 as shown in FIGS. 1, 2 and 3 is comprised of a transversly extending bent over portion of the sheet metal to provide a transverse rib 36. This transverse rib forming the head portion provides further strength and rigidity.

The tines 28 are best shown in FIGS. 1, 2, 5 and 6. The tines at the portion connected to the head are comprised of side walls 40 and 42 connected together by a bight portion 44 to form a U-shaped cross section as best shown in FIG. 6. This U-shaped cross section has a greater depth than width to provide a high degree of strength and ruggedness and rigidity in the tine structure. The U-shaped construction as shown in FIG. 5, tapers together to a point where the side walls 40 and 42 are pressed solidly together at about the mid-point of the tines to from a solid pressed together forward portion 46 as best shown in FIG. 5. By this construction a tapering U-shaped construction which starts at the head connection and terminates at about the mid-point of the length of the tines provides not only strength and rigidity but a limited area for collection of organic matter such as leaves and dirt and the like which would tend to cause rust and deterioration over a period of time.

The sheet metal construction of this rake is of simple manufacture which lends itself to low cost production while providing an economical and rugged rake. A flat metal blank not shown is first of all pressed by a machine press or the like to the construction shown in FIG. 7 to a partially formed frustoconical ferrule 32 receiving the rake handle and the transverse boundary ribs 30 and the head portion 26. In this opertion the tines 28 are preliminary formed in the U-shaped cross section shown in FIG. 6.

In the second operation the head portion 26 is bent over to form the transverse rib 36 and the tines are bent together and formed to the final pressed together tine construction shown in FIGS. 3, 5 and 6.

A modified rake like implement using the basic body and tine construction of this invention is shown in the garden cultivator 50 of FIG. 8. This cultivator has a body portion 52 a rearwardly extending handle receiving portion 54, tines 56 and an extension of the handle ferrule provided a rib 58. The tines are of the same general construction as the tine 26 of the rake 20. Thus a similarly U-shaped portion is connected to the head and pressed together free ends provide a solid tine construction.

The body construction is more particularly shown in FIGS. 8, 9 and 10. A reinforcing boundary flange or rim 60 borders the body and extends to the head and outermost walls of the end tines. The einforcing rib 58 as in the rake extends longitudinally through the body to the head portion.

The construction of the tines 56 is best shown in FIGS. 8, 9 and 11. They are of clawlike configuraton and are connected to the head 50 by an elongated portion 62 of U-shaped cross-section having side walls 64 and 66 connected by a bight portion 68. A knuckle member 70 connects the tine member. This tine member as in the rake has the side walls pressed solidly together from just below the knuckle to the ends of the tines as indicated by reference numeral 72.

USE

The lightweight implements 20 and 50 of this invention are used in the same manner as conventional rakes and cultivators and are of particular advantage as rugged lightweight floral rakes and cultivators. They provide an extremely strong and rigid construction comparable to forged rakes and cultivators without the cost and requirement of special mannufacturing equipment.

Thus the rake 20 connected to a conventional handle is used in the same fashion as an ordinary rake. The tines are extremely strong and durable and largely avoid accumulation of debris in the U-shaped wall construction provided. The cultivator 50 is used in a similar fashion to conventional cultivators and likewise provides a rugged strong and durable construction.

Various changes and modifications may be made within this invention as will be readily apparent to those skilled in the art. Such change and modifications are within the scope and teaching of this invention as defined by the claims appended hereto.

What is claimed is:

1. A sheet metal garden tool comprised of a flat body bounded on its edges by a forwad head portion, a rearward central handle receiving portion, and opposed side portions each bounded by a generally perpendicular bent over flange, said side portions curving rearwardly from said forward head portion to said handle receiving portion, said head portion having a plurality of forward extending tines, said tines having spaced apart side walls of substantially uniform depth defining a generally inverted U-shaped cross section at the rear thereof and merging with a flange portion of said head, said flange portion extending at right angles to the tines and having sections thereof connected at opposed ends to said tine side walls, the outer tines having outer downwardly extending side walls formed in the same plane as the bent over flanges of the body and formed so that each of said outer side walls forms a continuous planar surface with one of said flanges, said flanges extending from said outer side walls of said tines as a continuous border of the body rearwardly to and merging with the handle receiving portion and said tine side walls being pressed solidly together at a forward terminating end portion, said latter portion extending a substantial length of the tine to provide strength and rigidity.

2. The sheet metal tool of claim 1, in which said flanges and said flange portion are provided with reinforcing ribs provided by trough shaped grooves formed in the sheet metal transversely at a forward end of the body and at opposed sides of the body extending from the handle receiving portion to the head portion.

3. The sheet metal tool of claim 2, in which the handle receiving portion is defined by a frustoconical ferrule formed as a bent over rearward extension of the body and a reinforcing rib provided by a trough shaped groove extends as a continuation of a portion of the frustoconical ferrule forwardly through the body to the head portion.

4. The sheet metal tool of claim 1, in which said flange portion is provided with a transverse reinforcing rib provided by trough shaped groove which extends from one side of the body to the opposite side and defines a boundary between the body and the head portion.

5. The sheet metal tool of claim 1, in which said flange portion is provided with a transverse reinforcing rib provided by a trough shaped groove which extends from one side of the body to the opposite side and defines a boundary between the body and the head portion and the handle receiving portion is defined by a frustoconical ferrule formed as a bent over rearward extension of the body and a reinforcing rib provided by a trough shaped groove extends as a continuation of a portion of the frustoconical ferrule forwardly through the body to the head portion.

6. The sheet metal tool of claim 1, in which the head portion is defined by a solid sheet metal member extending from one side of the tool to the other and forwardly a lesser distance than the aforesaid distance between the sides.

7. The sheet metal tool of claim 6, in which said U-shaped cross sections extend into the tines about half their length to the point wher the side walls of the tines are pressed together.

8. The sheet metal tool of claim 1, in which said flanges and said flange portion are provided with reinforcing ribs which are provided by trough shaped grooves open at the bottom and formed in the sheet metal transversely at a forward end of the body and at sides of the body extending from the handle receiving portion to the head portion, the handle receiving portion being defined by a frusto-conical ferrule formed as a bent over rearward extension of the body, a reinforcing rib provided by an open at the bottom trough shaped groove extending as a continuation of a portion of the frusto-conical ferrule forwardly through the body to the head portion, the head portion being defined by a solid sheet metal member extending from one side of the body to the other and forwardly a lesser distance than the aforesaid distance between the sides, said tines being formed with reinforcing ribs having a U-shaped cross-section open at the bottom extending as a continuation of the rear part of the side walls of the tines into said sheet metal member and said side walls extending into the tines about half their length to a point where the side walls of the tines are pressed solidly together.

* * * * *